(12) United States Patent
Lee (10) Patent No.: US 7,373,178 B2
(45) Date of Patent: May 13, 2008

(54) METHOD FOR PROVIDING GUIDE BROADCASTING FOR VIDEO PHONE BY MEANS OF FALLBACK BETWEEN SPEECH MODE AND DATA MODE

(75) Inventor: Hyun-Jeong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 11/092,754

(22) Filed: Mar. 30, 2005

(65) Prior Publication Data

US 2005/0221826 A1    Oct. 6, 2005

(30) Foreign Application Priority Data

Mar. 30, 2004    (KR) ............... 10-2004-0021572

(51) Int. Cl.
*H04B 1/38*    (2006.01)
*H04M 1/00*    (2006.01)
*H04M 11/00*   (2006.01)
*H04Q 7/20*    (2006.01)
*H04Q 7/38*    (2006.01)
*H04N 7/14*    (2006.01)

(52) U.S. Cl. ............... 455/563; 455/421; 455/466; 455/550.1; 455/560; 455/552.1; 455/414.4; 348/14.01

(58) Field of Classification Search .. 455/412.1–412.2, 455/414.2, 414.4, 423–425, 432.2, 401, 434, 455/452.2, 453, 464, 466, 517, 415–421, 455/88, 445, 436–451, 62, 66.1, 66.11, 550.1, 455/552.1, 553.1, 556.2, 560–561, 418, 455, 455/458, 461, 563, 567, 463, 450, 3.06, 422.1; 370/331–333, 341, 395.21, 395.3, 259–262; 348/14.01, 14.02; 379/93.32, 93.34, 88.13, 379/88.16, 88.18, 201.07, 201.08, 210.01, 379/265.09; 704/270.1
See application file for complete search history.

(56) References Cited

U.S. PATENT DOCUMENTS

| | | | | |
|---|---|---|---|---|
| 6,374,102 | B1 * | 4/2002 | Brachman et al. | ........ 455/422.1 |
| 6,646,998 | B1 * | 11/2003 | Rasanen | ..................... 370/328 |
| 6,751,204 | B1 * | 6/2004 | Foti et al. | .................. 370/328 |
| 6,868,080 | B1 * | 3/2005 | Umansky et al. | ........... 370/354 |
| 7,069,008 | B1 * | 6/2006 | Hill et al. | .................... 455/434 |
| 2002/0077109 | A1 * | 6/2002 | Rasanen | ..................... 455/450 |
| 2004/0076145 | A1 * | 4/2004 | Kauhanen et al. | .......... 370/352 |
| 2005/0064821 | A1 * | 3/2005 | Hedberg et al. | ...... 455/67.11 |

FOREIGN PATENT DOCUMENTS

WO    WO 01/76288 A1 * 10/2001

* cited by examiner

*Primary Examiner*—Meless Zewdu
(74) *Attorney, Agent, or Firm*—Roylance, Abrams, Berdo & Goodman, L.L.P.

(57) ABSTRACT

Disclosed is a method for providing a guide broadcasting in the same way as that for a voice call without changing hardware in a mobile communication system supporting a video phone. In the method, a Mobile Station transmits a 'SETUP' message for requesting multimedia communication and fallback speech communication to a Mobile Switching Center, and switches into a speech mode and receives a voice guide broadcasting from the Mobile Switching Center, when a 'CALL PROCEEDING' message or a 'MODIFY' message for indicating the fallback speech communication is received from the Mobile Switching Center before. The method provides service users with convenience in terms of continuity for an existing voice service and provides carriers with an opportunity for creating new profits through differentiation of services.

16 Claims, 7 Drawing Sheets

METHOD FOR PROVIDING GUIDE BROADCASTING FOR VIDEO PHONE BY MEANS OF FALLBACK BETWEEN SPEECH MODE AND DATA MODE

PRIORITY

This application claims to the benefit under 35 U.S.C. §119(a) of an application entitled "Method for providing Guide Broadcasting for Video phone by means of Fallback Between Speed Mode and Data Mode" filed in the Korean Intellectual Property Office on Mar. 30, 2004 and assigned Serial No. 2004-21572, the entire contents of which are hereby incorporated by reference.

BACKGROUND OF THE INVENTION

1. Field of the Invention

The present invention relates to a video phone system. More particularly, the present invention relates to a method for providing a guide broadcasting in the same way as that for a voice call without a change of hardware in a mobile communication system supporting a video phone. Embodiment of the present invention relates to embodiments for providing a guide broadcasting before a call is set up, after a call is set up, and when a call forwarding is performed in providing a video phone service in a mobile communication system.

2. Description of the Related Art

Generally, 3G mobile communication systems using Code Division Multiple Access (CDMA) technology, such as Universal Mobile Telecommunication Service (UMTS) systems, CDMA 2000 1x systems and 1x Evolution Data and Voice (EV-DV) systems, provide consistent services capable of transmitting packet-based texts, digitized voices, and video and multimedia data at a high speed of more than 2 Mbps regardless of the user's global position.

Further, 3G mobile communication systems can distinguish voice calls, which are realtime and have narrow bandwidths, from data calls, which are sensitive to errors and have very wide bandwidths, and provide communication services in speech modes when the voice calls are required. Also, 3G mobile communication systems can provide communication services in data modes when the data calls are required. The voice call is connected through an existing Public Switched Telephone Network (PSTN) called a circuit switched network and the data call is connected through a packet data network, such as the Internet, called a packet switched network.

A video phone service simultaneously transmits voice data and video data, displays the appearance of a listener on a screen during communications, so that a speaker can talk to the listener while seeing the appearance of the listener. As compared with a speech communication service, the video phone service as described above can provide the speaker with greater satisfaction because it enables the speaker to talk to the listener while seeing the appearance of the listener.

Meanwhile, an existing circuit-based mobile phone service provides a guide broadcasting and various tones, which report 'Voice Mailing Service (VMS) forwarding', 'no response', and 'busy' for voice calls. However, since the video phone service is basically provided in a data mode, it is unable to be linked to the guide broadcasting typically provided through voice service. Accordingly, it is necessary to provide a technology capable of providing a guide broadcasting for a video phone in the same level as that for the existing voice call.

SUMMARY OF THE INVENTION

Accordingly, the present invention has been made to solve the above-mentioned problems occurring in the prior art, and it is an object of the present invention to provide a method for providing a guide broadcasting in a video phone system.

It is another object of the present invention to provide a method for providing a guide broadcast by the same scheme as that of a voice call without a change of hardware in a video phone system.

It is further another object of the present invention to provide a method for providing a guide broadcast by means of a fall-back function between a data mode and a speech mode in a video phone system.

In accordance with one aspect of the present invention, there is provided a method for providing a voice guide broadcast before a call setup for multimedia communication in a mobile communication system providing speech communication and multimedia communication to a Mobile Station (MS) operating in a speech mode and a data mode. The method comprises the steps of checking whether connection to a terminating MS is possible when a 'SETUP' message requesting multimedia communication and fallback speech communication for communication with the terminating MS is received from an originating MS; transmitting a 'CALL PROCEEDING' message to permit the fallback speech communication to the originating MS in order to allow the originating MS to operate in the speech mode when it is unable to connect to the terminating MS; and establishing a bearer for the fallback speech communication with the originating MS, and transmitting the voice guide broadcast for reporting that it is unable to connect to the terminating MS through the bearer.

In accordance with another aspect of the present invention, there is provided a method for providing a voice guide broadcast after a call setup for multimedia communication in a mobile communication system providing speech communication and multimedia communication to a Mobile Station (MS) operating in a speech mode and a data mode. The method comprises the steps of establishing bearers for the multimedia communication between an originating MS and a terminating MS when a 'SETUP' message requesting multimedia communication and fallback speech communication for communication with the terminating MS is received from the originating MS; ringing a bell in the terminating MS and checking whether the terminating MS responds to the ringing; transmitting a 'MODIFY' message for indicating the fallback speech communication to the originating MS in order to allow the originating MS to operate in the speech mode when the terminating MS does not respond to a ringing; and establishing a bearer for the fallback speech communication with the originating MS, and transmitting the voice guide broadcast for reporting that it is unable to connect to the terminating MS through the bearer.

In accordance with another further aspect of the present invention, there is provided a method for providing a voice guide broadcast when a call forwarding is performed before a call setup for multimedia communication in a mobile communication system providing speech communication and the multimedia communication to a Mobile Station (MS) operating in a speech mode and a data mode. The method comprises the steps of checking whether call forwarding has been set for a terminating MS when a 'SETUP' message requesting multimedia communication and fallback speech communication for communication with the terminating MS is received from an originating MS; transmitting a 'CALL PROCEEDING' message indicating the fallback speech communication to the originating MS in order to allow the originating MS to operate in the speech mode when the call forwarding has been set for the terminating MS; and establishing a bearer for the fallback speech communication with the originating MS, and transmitting the voice guide broadcast reporting that the call forwarding is performed through the bearer.

In accordance with still another aspect of the present invention, there is provided a method for providing a voice guide broadcasting after a call setup for multimedia communication in a mobile communication system providing speech communication and the multimedia communication to a Mobile Station (MS) operating in a speech mode and a data mode. The method comprises the steps of receiving a 'SETUP' message for requesting multimedia communication and fallback speech communication for communication with a terminating MS from an originating MS; establishing bearers for the multimedia communication between an originating MS and a terminating MS when a 'SETUP' message requesting multimedia communication and fallback speech communication for communication with the terminating MS is received from the originating MS; ringing a bell in the terminating MS and checking whether the terminating MS responds to the ringing; transmitting a 'MODIFY' message indicating the fallback speech communication to the originating MS in order to allow the originating MS to operate in the speech mode when the terminating MS does not respond to the ringing and a call forwarding has been set for the terminating MS; and establishing a bearer for the fallback speech communication with the originating MS, and transmitting the voice guide broadcast for reporting that it is unable to connect to the terminating MS through the bearer.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments according to the present invention will be described with reference to the accompanying drawings. In the following description of the exemplary embodiments of the present invention, a detailed description of known functions and configuration incorporated herein will be omitted for the sake of conciseness. The terms described in the following description are defined by taking functions thereof into consideration, so they may vary according to the intentions of a user and an operator or depending upon custom. Accordingly, the terms must be defined based on the entire contents of the present application.

Hereinafter, a UMTS system will be described, which is an asynchronous 3G mobile communication system using a wideband CDMA implementation based on a Global System for Mobile Communication (GSM) and a General Packet Radio Services (GPRS), which are mobile communication systems used in Europe.

Figure 1:
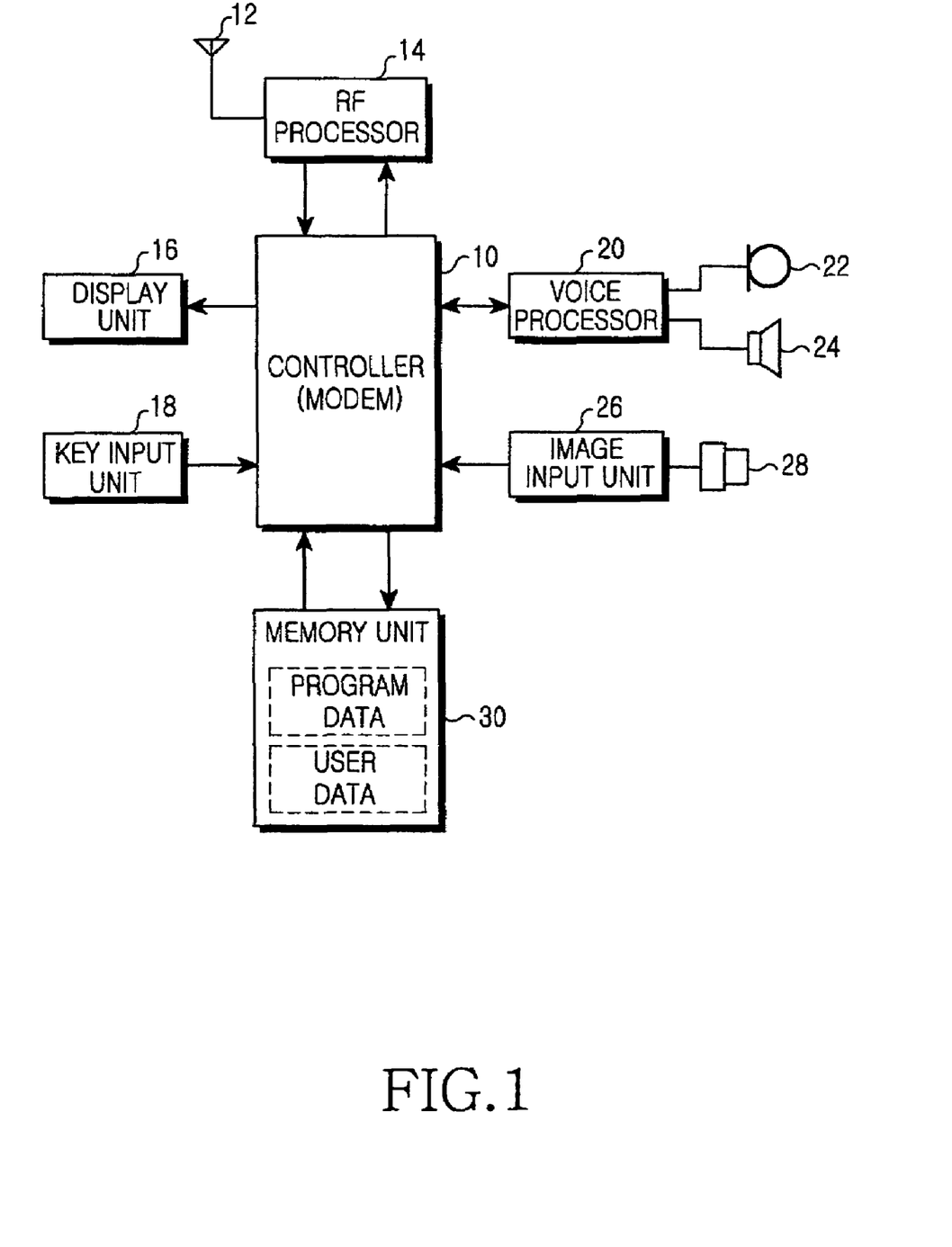
FIG. 1 is a block diagram schematically showing the construction of a portable mobile equipment for communication, which can perform multimedia communication, according to an embodiment of the present invention.

FIG. 1 is a block diagram schematically showing the construction of a portable mobile equipment for communication, which can perform multimedia communication, according to an embodiment of the present invention.

Referring to FIG. 1, a controller 10 performs a general control operation for a mobile communication terminal and preferably includes a modem chip. An Radio Frequency (RF) processor 14 controlled by the controller 10 down-converts frequency bands of signals received from a network through radio channels of predetermined frequency bands by means of an antenna 12. Further, the RF processor 14 distinguishes the types of signals, and outputs the signals to the controller 10 or a voice processor 20 and a display unit 16. The signals output from the RF processor 14 to the controller 10 can include data signals received through traffic channels or paging signals and control signals received through control channels. Furthermore, the RF processor 14 up-converts data received from the controller 10 or coded voice and image data received from the voice processor 20 and an image input unit 26 into radio signals of predetermined frequency bands, and transmits the radio signals through the antenna 12.

The voice processor 20, generally includes a vocoder, and other typical components, is controlled by the controller 10. The voice processor 20 encodes electrical voice signals received from a Microphone (MIC) 22 and transfers the encoded voice signals to the RF processor 14 through the controller 10. Further, the voice processor 20 converts coded voice data received from the RF processor 14 through the controller 10 into decoded electrical voice signals, and outputs the decoded electrical voice signals to a speaker (SPK) 24. The speaker 24 amplifies the received decoded electrical voice signals, converts the received electrical voice signals into audible sound, and outputs the audible sound.

The display unit 16 preferably includes a device, such as a Liquid Crystal Display (LCD), which displays a proceeding state by means of text, an icon, or the like, and preferably a vibration motor or an alarm lamp, or any combination of thereof. The display unit 16 displays a current state of the mobile communication terminal, converts the data input through the key input of a user into text, an icon or a character, and controls the display of the text, the icon or the character. Further, the display unit 16 decodes coded image data input from the RF processor 14 via the controller 10, and controls the display of the decoded data.

The image input unit 26 is connected to a camera 28 for image photographing. The image input unit 26 coverts electrical image signals photographed by the camera 28 into coded image data through an analog-to-digital conversion, image coding, or other means, and inputs the coded image data to the controller 10.

A key input unit 18 has a general key matrix structure and includes alphanumeric keys for dialing, and function keys for performing various functions, that is, keys for selection, keys for movement upward, downward, leftward and rightward, and other system navigation functions. The key input unit 18 generates key data corresponding to keys input by a user and outputs the key data to the controller 10. A memory unit 30 may include a Read Only Memory (ROM), a Random Access Memory (RAM), or other types of memory, such as a portable memory. Further, the memory unit 30 preferably includes an area for storing program codes required for control of the controller 10, an area for storing user data, an area for temporarily storing data generated in the control of the controller 10, or the like.

When a user wants to operate the keys of the key input unit 18 and originates a call for multimedia communication, the controller 10 executes the program application codes for the multimedia communication in the memory unit 30, operates the camera 28 of the image input unit 26 and the microphone 22 and the speaker 24 of the voice processor 20, and enters a data mode. Simultaneously, the controller 10 accesses the network through the RF processor 14 and attempts to complete a communication path for the multimedia communication to a party the user desires to call, i.e. a called party.

When a paging message is received from the network via the antenna 12 and the RF processor 14, the controller 10 confirms that the page is a page for the mobile communication terminal. Then, the controller 10 determines whether the page is for multimedia communication or general communication. When the page is for multimedia image communication, the controller 10 executes the program application codes for the multimedia communication in the memory unit 30, operates the camera 28 of the image input unit 26 and the microphone 22 and the speaker 24 of the voice processor 20, and enters the necessary data mode. Simultaneously, the controller 10 responds to the network through the RF processor 14 and connects a data packet communication path for the multimedia communication to a calling party.

Meanwhile, when a call for speech communication is originated or terminated, the controller 10 enters a speech mode and operates only the microphone 22 and speaker 24 of the voice processor 20.

Figure 2:
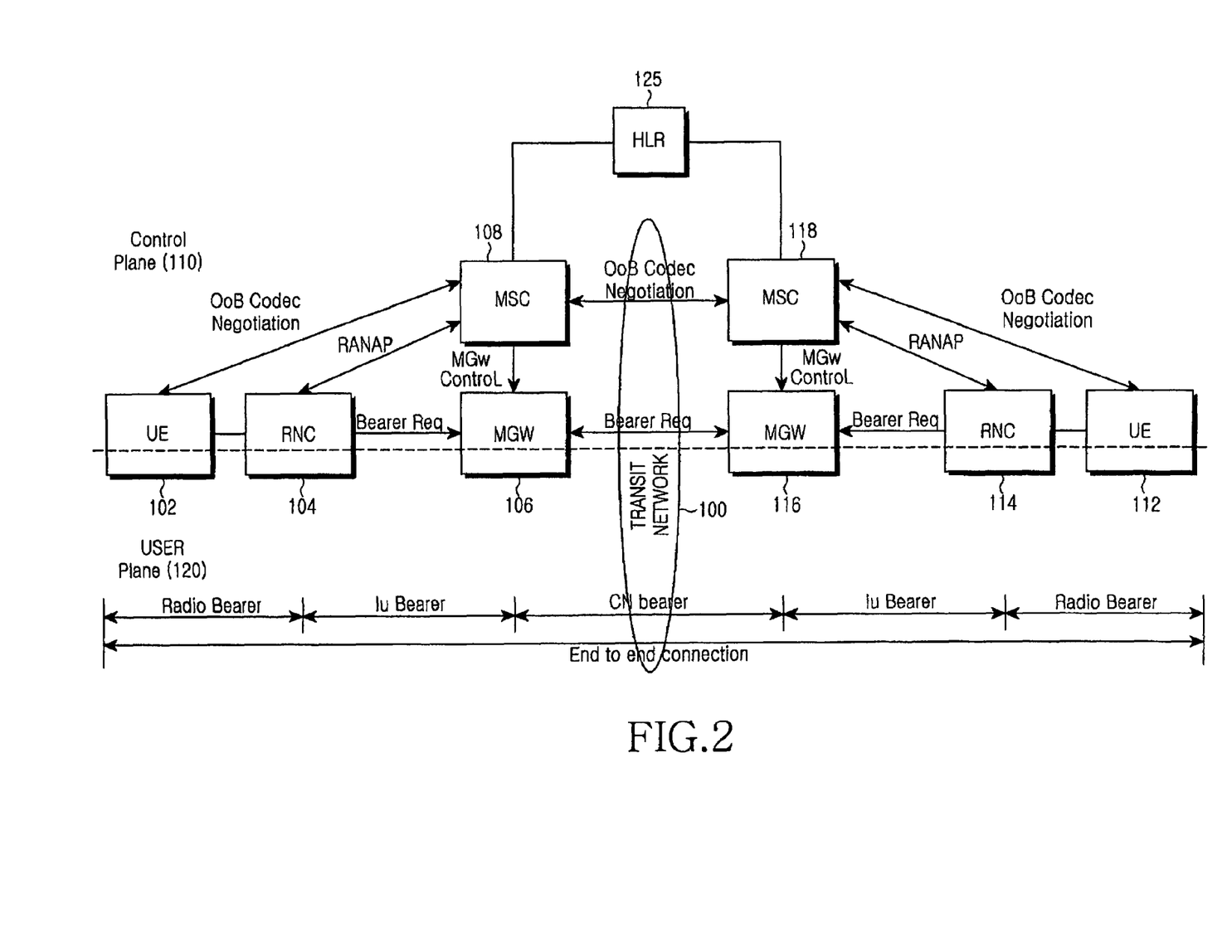
FIG. 2 is a diagram schematically showing the network construction of a UMTS system capable of supporting a video phone function according to an embodiment of the present invention.

FIG. 2 is a diagram schematically showing the network construction of a UMTS system capable of supporting a video phone function according to an embodiment of the present invention.

Referring to FIG. 2, a User Equipment (UE) 102 of a calling party connects to a base station called a node B through a radio interface 'Iub'. The node B connects signaling and user traffic from the UE 102 to an originating Radio Network Controller (RNC) 104 through an interface 'Iur'. The RNC 104 connects to a transit network 100 through a Media Gateway (MGW) 106. The UE 102, the RNC 104 and the MGW 106 interconnect bearers for a call setup under the control of an originating Mobile Switching Center (MSC) 108.

A terminating UE 112 also connects to a terminating RNC 114 through a node B and the RNC 114 connects to the transit network 100 through a MGW 116. Similarly, the UE 112, the RNC 114 and the MGW 116 interconnect bearers for a call setup under the control of a terminating MSC 118.

In the mobile communication network having the construction as described above, a control plane 110 relates to the MSCs 108 and 118 and a User Plane (UP) 120 includes the nodes 102, 104, 106, 116, 114 and 112 through which user traffic actually passes. Further, connection between the UE 102 and the RNC 104 and connection between the UE 112 and the RNC 114 are accomplished through radio bearers, and connection between the RNC 104 and the MGW 106 and connection between the RNC 114 and the MGW 116 are accomplished through Iu bearers. Further, connection between the MGWs 106 and 116 through the transit network 100 will be referred to as a core network (CN) bearer. Herein, an End-to-End connection is accomplished between the UEs 102 and 112 through the bearers.

Each of the MSCs 108 and 118 acquires subscriber information and call-related information of the corresponding UEs 102 or 112 from a Home Location Register (HLR) 125, and controls the connection. Further, when an event such as 'busy', 'no response' or 'call forwarding' occurs, each of the MSCs 108 and 118 provides the UEs 102 and 112 with voice guide broadcasts through a voice guide broadcast module therein or an external voice guide broadcast server.

Hereinafter, an operation for providing a guide broadcast to a UE including a video phone function in the same way as that for a voice call will be described with reference to flow diagrams as provided in embodiments of the present invention. Embodiments of the present invention relate to a procedure for providing a guide broadcast before a call is set up, a procedure for providing a guide broadcast after a call is set up, and a procedure for providing a guide broadcast when a call forwarding is performed. Herein, the call setup means that a bearer for multimedia is set between a UE and a system.

The release 5 of the $3^{rd}$ Generation Partnership Project (GPP) standard for an asynchronous UMTS communication system proposes a fallback function between a data mode and a speech mode. Accordingly, embodiments of the present invention provide guide broadcasts for video phones by means of the aforementioned fallback function. However, application of embodiments of the present invention is not limited to the aforementioned UMTS communication system. That is, it is noted that embodiments of the present invention can also be applied to another type of mobile communication system supporting a similar technology.

Figure 3:
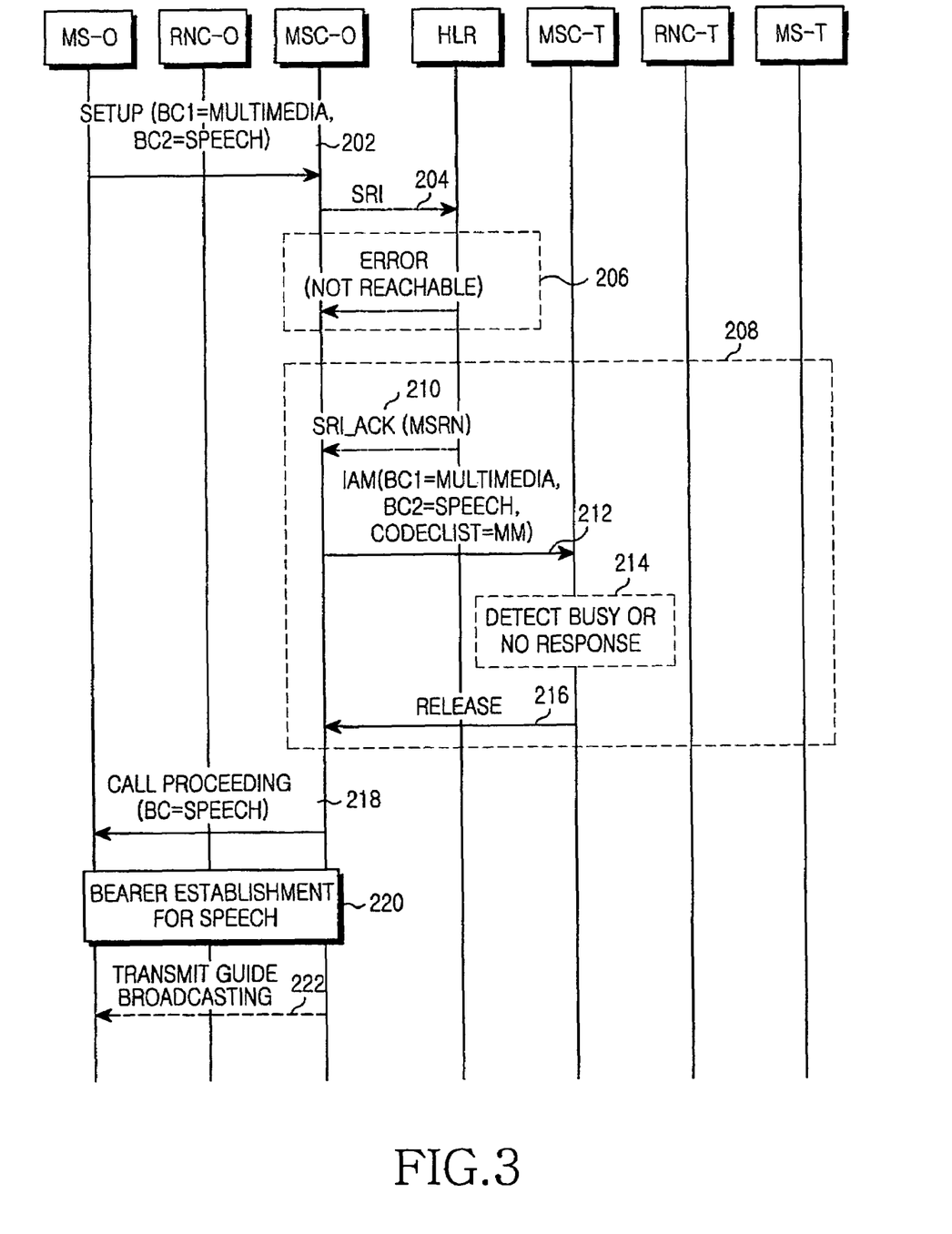
FIG. 3 is a flow diagram illustrating a procedure for providing a guide broadcast before a call setup for multimedia communication according to an embodiment of the present invention.

FIG. 3 is a flow diagram illustrating a procedure for providing a guide broadcast before a call setup for multimedia communication according to an embodiment of the present invention.

Referring to FIG. 3, in step 202, an Originating Mobile Station (MS-O) transmits a 'SETUP' message requesting the call setup for the multimedia communication to an Originating MSC (MSC-O) through an Originating RNC (RNC-O). The 'SETUP' message preferably includes a Bearer Capability (BC) 1 representing the types of calls preferentially requested and a BC 2 representing the types of calls substituted when the BC is unable to be completed. The BC 1 is set as "multimedia" for the multimedia communication and the BC 2 is set as "speech" for fallback voice communication. For example, the BCs may include a bandwidth of the information transmission path requested by an MS-O for the multimedia communication and the voice communication.

In step 204, the MSC-O transmits a signaling message Send Routing Information (SRI) to a HLR in which the MS-O has been registered and requests information for path connection to a terminating MS (MS-T) with respect to the MS-O. Herein, if the MS-O cannot receive a call due to a roaming restricted state or the purged state of the MS-O, the HLR transmits an 'ERROR' message of 'not reachable' to the MSC-O in step 206. Otherwise, the HLR transmits a message SRI_ACK, which includes a Mobile Station Roaming Number (MSRN) for identifying a terminating MSC (MSC-T) currently providing a service to the MS-T, to the MSC-O through a terminating RNC (RNC-T) in step 210.

In step 212, the MSC-O transmits an Initial Address Message (IAM) for requesting a path setup to the MSC-T identified by the MSRN. The IAM includes a BC 1 set as 'multimedia', a BC 2 set as 'speech' and a CodecList set as 'mm'. Herein, the CodecList 'mm' means allocation of a codec speed suitable for multimedia. In step 214, the MSC-T checks a state of the MS-T in response to the IAM. The state of the MS-T may be already recognized by the MSC-T or may be determined according to whether a response to a page of the MS-T is received.

As a result of the check, if the MS-T is in a busy state or a no-response state, the MSC-T transmits a 'RELEASE' message to the MSC-O and informs the MSC-O that the call cannot be set up, in step 216. The procedure 208, which includes steps 210, 212, 214 and 216, is for checking the state of the MS-T and is accomplished when step 206 is not performed.

When the 'ERROR' message in step 206 or the 'RELEASE' message in step 216 is received, the MSC-O transmits a 'CALL PROCEEDING' message, which includes a BC 2 set as 'speech', to the MS-O in order to report the setup of the fallback speech communication designated by the BC 2 of the message 'SETUP', in step 218. For example, the BC includes bandwidth information for the speech communication permitted by the MSC-O. Then, the MS-O switches into a speech mode, stops the image input unit 26, and operates only the voice processor 20. Herein, the mode switching is for providing the MS-O with a voice guide broadcasting.

In step 220, the MSC-O establishes a bearer (information transmission path) for speech communication between the voice guide broadcast module therein or the external voice guide broadcast server (herein referred to as the voice guide broadcast module) and the MS-O. Accordingly, in step 222, the voice guide broadcast for reporting that the MS-T is in the busy state or the no-page-response state is provided from the voice guide broadcast module to the MS-O. Then, the call is ended.

Figure 4:
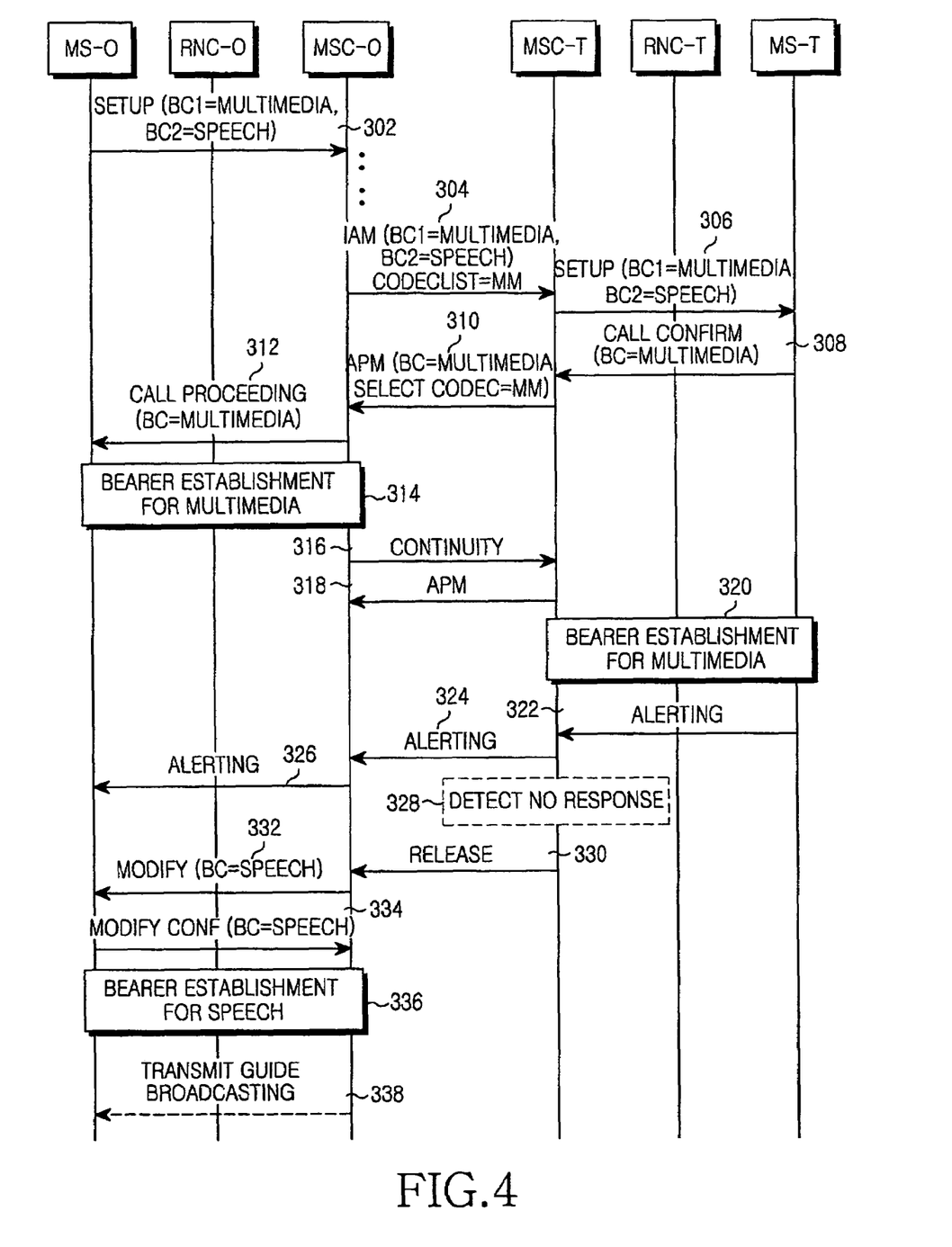
FIG. 4 is a flow diagram illustrating a procedure for providing a guide broadcast after a call setup for multimedia communication according to an embodiment of the present invention.

FIG. 4 is a flow diagram illustrating a procedure for providing a guide broadcasting after a call setup for multimedia communication according to a second embodiment of the present invention.

Referring to FIG. 4, in step 302, an MS-O transmits a 'SETUP' message for requesting the call setup for the multimedia communication to an MSC-O through an RNC-O. The 'SETUP' message includes a BC 1 representing the types of calls preferentially requested and a BC 2 representing the types of calls substituted when the BC is unable to be completed. The BC 1 is set as "multimedia" for the multimedia communication and the BC 2 is set as "speech" for fallback voice communication. An MSC-O performs an authentication for the MS-O in response to the 'SETUP' message, and acquires information for connecting a path to an MS-T from a HLR in which the MS-O has been registered.

If a message 'SRI_ACK', which includes a MSRN for identifying a MSC-T currently providing a service to the MS-T, is normally acquired, the MSC-O transmits an IAM for requesting a path setup to the MSC-T identified by the MSRN, in step 304. The IAM includes a BC 1 set as 'multimedia', a BC 2 set as 'speech' and a CodecList set as 'mm'. In step 306, the MSC-T transmits a 'SETUP' message including a BC 1 set as 'multimedia' and a BC 2 set as 'speech' to the MS-T in response to the IAM.

If a 'CALL CONFIRM' message, which includes a BC set as 'multimedia' representing that multimedia communication is possible, is received from the MS-T in step 308, the MSC-T transmits an Access Parameter Message (APM) including a BC set as 'multimedia' and a Select codec set as 'mm' to the MSC-O in step 310. Then, in step 312, the MSC-O transmits a 'CALL PROCEEDING' message including a BC set as 'multimedia' to the MS-O in order to report the setup of the multimedia communication. Accordingly, the MS-O operates in a data mode and operates the image input unit 26.

Then, the MSC-O sets an originating bearer for multimedia communication with the MS-O in step 314, and transmits a 'CONTINUITY' message to the MSC-T in order to report that the setup of the originating bearer has been completed in step 316. The MSC-T transmits the APM in response to the 'CONTINUITY' message in step 318 and sets a terminating bearer for multimedia communication with the MS-T in step 320. In step 322, an 'ALERTING' message representing a ring back tone for a ring generated in the MS-T is transferred to the MSC-T. The MSC-T transfers the 'ALERTING' message to the MSC-O in step 324, and the MSC-O transfers the 'ALERTING' message to the MS-O and allows the ring back tone to sound in step 326.

If the MS-T does not respond to the ring back tone by passage of a predetermined time in step 328, the MSC-T determines that a 'no response' is detected and transmits a 'RELEASE' message to the MSC-O in step 330. Then, in step 332, the MSC-O transmits a 'MODIFY' message, which includes a BC set as 'speech', to the MS-O in order to report the setup of the fallback speech communication designated by the BC 2 of the 'SETUP' message. Then, the MS-O switches into a speech mode, stops the image input unit 26, and operates only the voice processor 20.

If a 'MODIFY CONFIRM' message corresponding to the 'MODIFY' message, which includes a BC set as 'speech', is received from the MS-O in step 334, the MSC-O establishes a bearer for speech communication between the voice guide broadcast module therein and the MS-O in step 336. Accordingly, in step 338, the voice guide broadcast for reporting the 'no response' of the MS-T is provided from the voice guide broadcasting module to the MS-O. Then, the call is ended.

Figure 5:
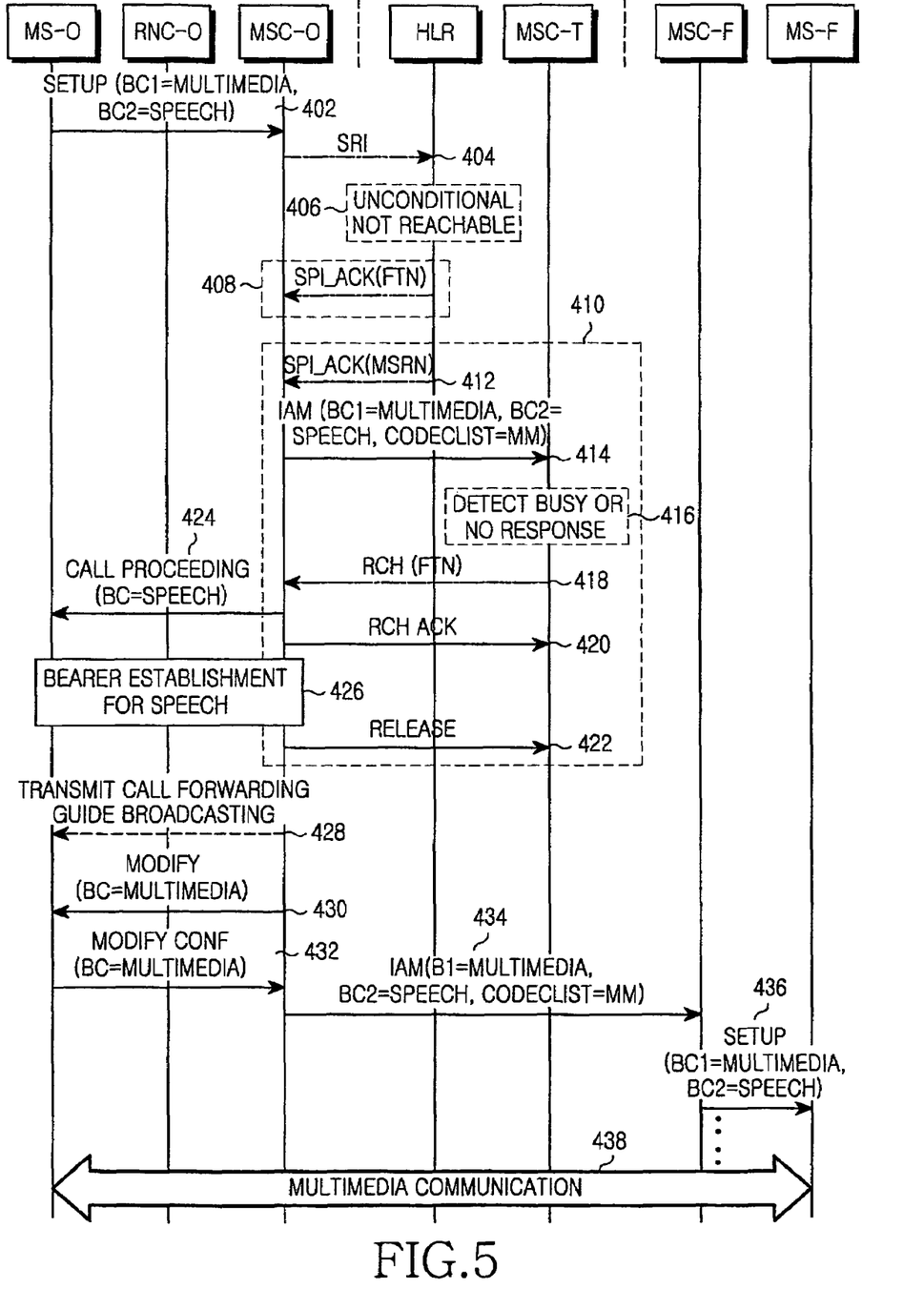
FIG. 5 is a flow diagram illustrating a procedure for providing a guide broadcast when a call forwarding is performed before a call setup for multimedia communication according to an embodiment of the present invention.

FIG. 5 is a flow diagram illustrating a procedure for providing a guide broadcast when a call forwarding is performed before a call setup for multimedia communication according to an embodiment of the present invention.

Referring to FIG. 5, in step 402, an MS-O transmits a 'SETUP' message for requesting the call setup for the multimedia communication through an RNC-O to an MSC-O. The 'SETUP' message includes a BC 1 representing the types of calls preferentially requested and a BC 2 representing the types of calls substituted when the BC is unable to be completed. The BC 1 is set as "multimedia" for the multimedia communication and the BC 2 is set as "speech" for fallback voice communication.

In step 404, the MSC-O transmits a signaling message 'SRI' to a HLR in which the MS-O has been registered and requests information for authentication for the MS-O and a path connection to an MS-T. The HLR checks the requested subscriber information for the MS-T in step 406. As a result of the check, if an unconditional call forwarding has been set for the MS-T, or the information for the path connection to the MS-T cannot be found and a call forwarding has been set for the MS-T, the HLR transmits a message 'SRI_ACK' including a Forwarding-to-Number (FTN) to the MSC-O in step 408.

Otherwise, the HLR, in step 412, transmits a message 'SRI_ACK', which includes a MSRN for identifying a MSC-T currently providing a service to the MS-T, to the MSC-O. Then, the MSC-O transmits an IAM for requesting a path setup to the MSC-T identified by the MSRN, in step 414. The IAM includes a BC 1 set as 'multimedia', a BC 2 set as 'speech' and a CodecList set as 'mm'. In step 416, the MSC-T checks a state of the MS-T in response to the IAM. The state of the MS-T may be already recognized by the MSC-T or may be determined according to whether a response to a page of the MS-T is received.

As a result of the check, if the MS-T is in a busy state or a no-page-response state and a call forwarding has been set for the MS-T in a connection failure, the MSC-T transmits a 'Resume Call Handling (RCH)' message including the FTN to the MSC-O in step 418. Herein, the MSC-O transmits a 'CALL PROCEEDING' message including a BC set as 'multimedia' to the MS-O in order to provide a voice guide broadcast in step 422, and transmits a message 'RCH ACK' to the MSC-T in step 420. Accordingly, the MS-O switches into a speech mode, stops the image input unit 26, and operates only the voice processor 20.

Then, the MSC-O establishes a bearer for speech communication between the voice guide broadcasting module therein and the MS-O in step 426, and transmits a 'RELEASE' message to the MSC-T in step 422. Further, the MSC-O transmits the voice guide broadcast for reporting the call forwarding to the MS-O from the voice guide broadcast module in step 428. Herein, the call is not ended. The procedure 410 including steps 412, 414, 416, 418, 420, 422 and 426 is for checking the call forwarding due to the busy state or the no-page-response state of the MS-T and is accomplished when step 408 is not performed.

Meanwhile, in step 430, the MSC-O transmits a 'MODIFY' message, which includes a BC set as 'multimedia', to the MS-O in order to report the setup of call-forwarded multimedia communication. Then, the MS-O switches into a data mode again, operates the image input unit 26 and the voice processor 20. Further, the MS-O transmits a 'MODIFY CONFIRM' message including a BC set as 'multimedia' to the MSC-O in step 432.

In step 434, the MSC-O transmits an IAM requesting a path setup to a forwarding MSC (MSC-F), of a Forwarding-To-Network (FTNW) currently providing a service to a forwarding MS (MS-F). The IAM includes a BC 1 set as 'multimedia', a BC 2 set as 'speech' and a CodecList set as 'mm'. In step 436, the MSC-F transmits a 'SETUP' message including a BC 1 set as 'multimedia' and a BC 2 set as 'speech' to the MS-F in response to the IAM. Further, the MSC-F checks the state of the MS-F, rings the bell, and checks whether a response to the ringing is detected. If the response to the ringing is not detected, the MSC-F transmits a 'RELEASE' message to the MSC-O according to the procedure as shown in FIG. 4. In contrast, if the response to the ringing is detected from the MS-F, multimedia communication is performed between the MS-O and the MS-F in step 438.

Figure 6A:
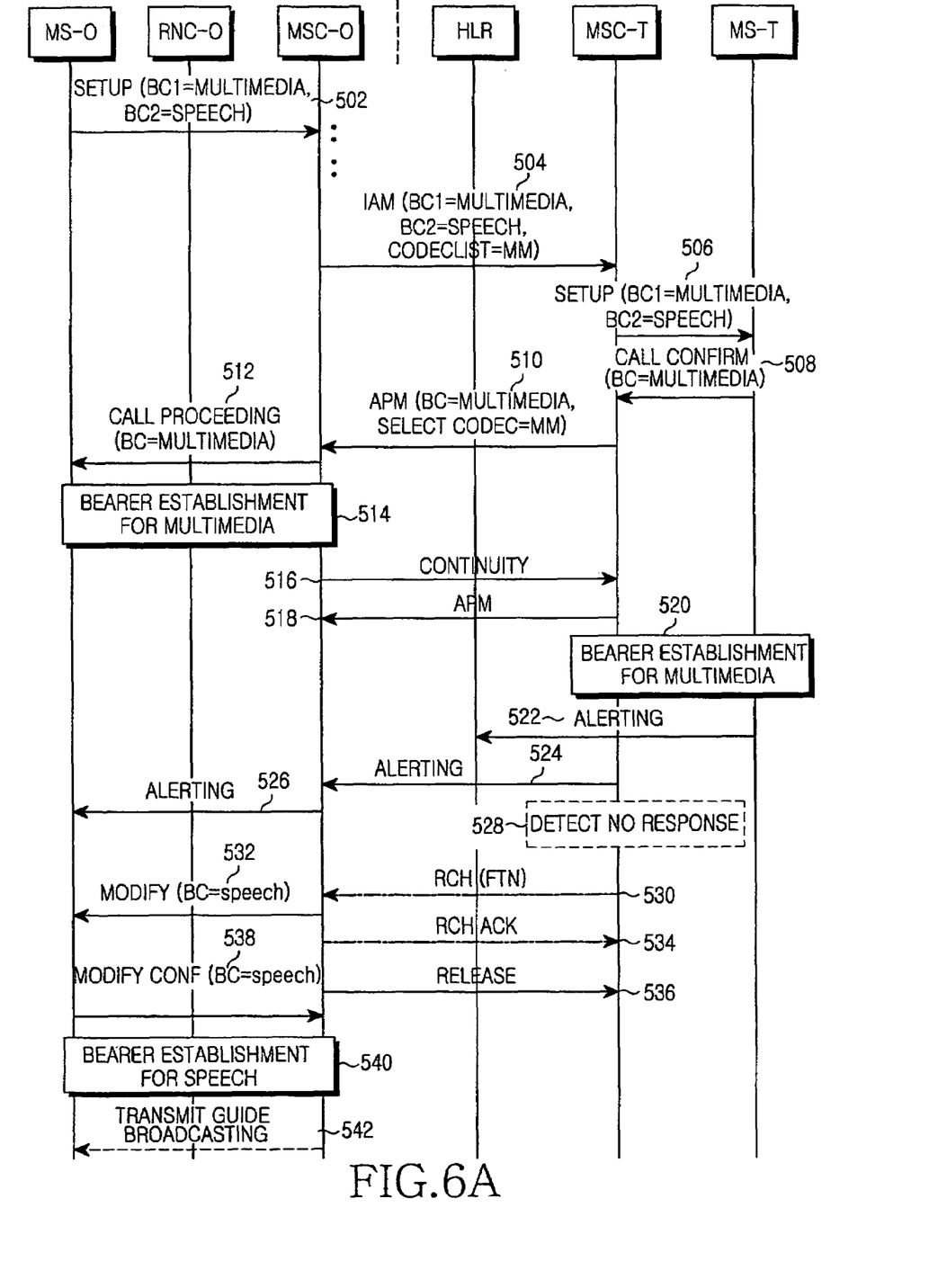
FIGS. 6a and 6b are flow diagrams illustrating a procedure for providing a guide broadcast when a call forwarding is performed after a call setup for multimedia communication according to an embodiment of the present invention.
Figure 6B:
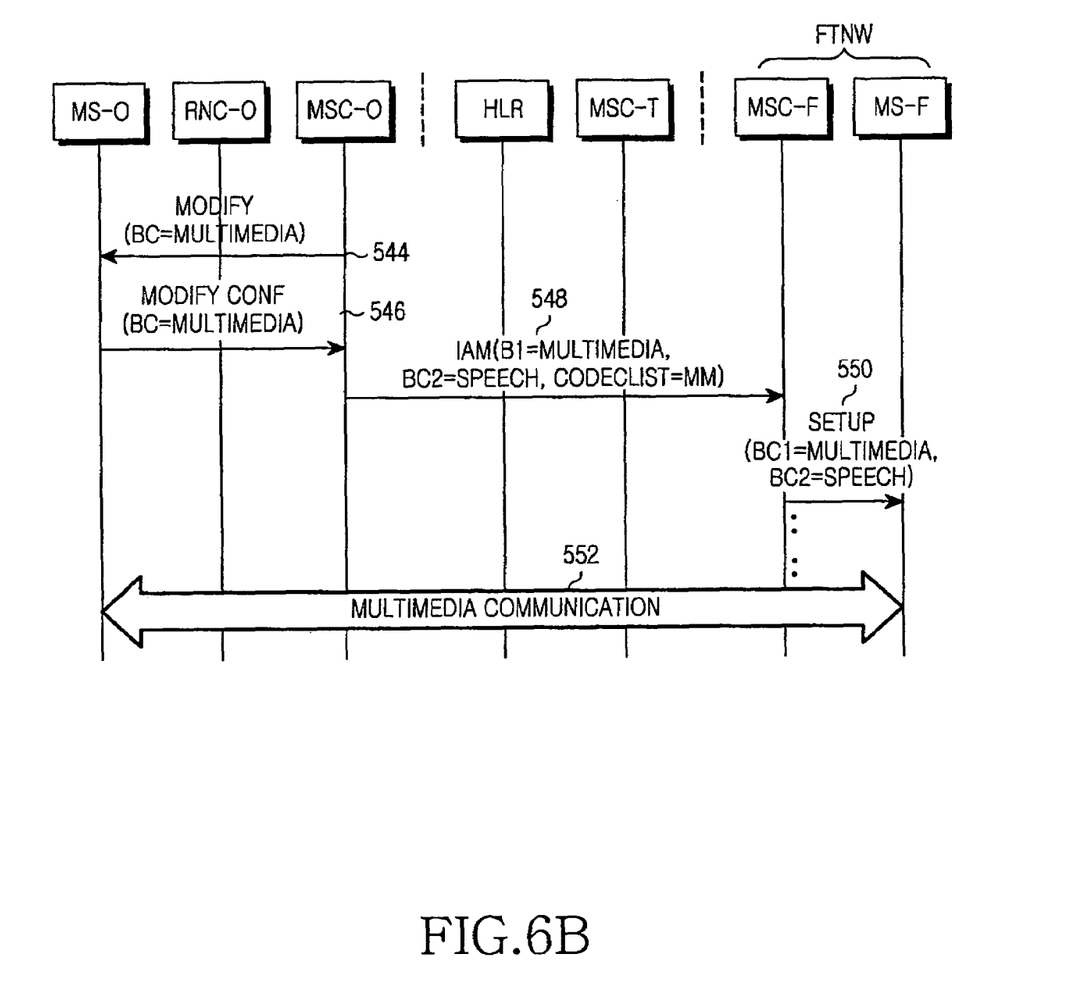

FIGS. 6a and 6b are flow diagrams illustrating a procedure for providing a guide broadcast when a call forwarding is performed after a call setup for multimedia communication according to an embodiment of the present invention.

Referring to FIGS. 6a and 6b, in step 502, an MS-O transmits a 'SETUP' message for requesting a call setup for the multimedia communication through an RNC-O to an MSC-O. The 'SETUP' message includes a BC 1 representing the types of calls preferentially requested and a BC 2 representing the types of calls substituted when the BC is unable to be completed. The BC 1 is set as "multimedia" for the multimedia communication and the BC 2 is set as "speech" for fallback voice communication. An MSC-O performs an authentication for the MS-O and acquires information to connect a path to an MS-T from a HLR in which the MS-O has been registered, in response to the 'SETUP' message.

If a message SRI_ACK, which includes a MSRN for identifying a MSC-T currently providing a service to the MS-T, is normally acquired, the MSC-O transmits an IAM requesting a connection path setup to the MSC-T identified by the MSRN, in step 504. The IAM includes a BC 1 set as 'multimedia', a BC 2 set as 'speech' and a CodecList set as 'mm'. In step 506, the MSC-T transmits a message 'SETUP' including a BC 1 set as 'multimedia' and a BC 2 set as 'speech' to the MS-T in response to the IAM.

If a 'CALL CONFIRM' message, which represents that multimedia communication is possible and includes a BC set as 'multimedia', is received from the MS-T in step 508, the MSC-T transmits an APM including a BC set as 'multimedia' and a Select codec set as 'mm' to the MSC-O in step 510. Then, in step 512, the MSC-O transmits a 'CALL PROCEEDING' message including a BC set as 'multimedia' to the MS-O in order to report the setup of the multimedia communication. Accordingly, the MS-O operates in a data mode and operates the image input unit 26.

Then, the MSC-O sets an originating bearer for multimedia communication with the MS-O in step 514, and transmits a 'CONTINUITY' message to the MSC-T in order to report that the setup of the originating bearer has been completed in step 516. The MSC-T transmits the APM in response to the 'CONTINUITY' message in step 518 and sets a terminating bearer for multimedia communication with the MS-T in step 520. In step 522, an 'ALERTING' message representing a ring back tone for a ring generated in the MS-T is transferred to the MSC-T. The MSC-T transfers the 'ALERTING' message to the MSC-O in step 524, and the MSC-O transfers the 'ALERTING' message to the MS-O and allows the ring back tone to sound in step 526.

If the MS-T does not respond to the ring back tone after the passage of a predetermined amount of time and the call forwarding has been set in a 'no response' of the MS-T in step 528, the MSC-T transmits a message 'RCH' including a FTN registered for the MS-T to the MSC-O in step 530. Herein, the MSC-O transmits a 'MODIFY' message, which includes a BC set as 'speech', to the MS-O in order to provide a voice guide broadcasting in step 532, and transmits a message 'RCH ACK' to the MSC-T in step 534. Accordingly, the MS-O switches into a speech mode, stops the image input unit 26, and operates only the voice processor 20.

In step 536, the MSC-O transmits a 'RELEASE' message to the MSC-T. Accordingly, the bearer having been set between the MSC-T and the MS-T is released by the 'RELEASE' message. When a 'MODIFY CONFIRM' message including a BC set as 'speech' is received from the MS-O in response to the 'MODIFY' message in step 538, the MSC-O establishes a bearer for speech communication between the voice guide broadcast module therein and the MS-O in step 540, and transmits the voice guide broadcast reporting the call forwarding to the MS-O from the voice guide broadcasting module in step 542. Herein, the call is not ended.

The following description is made with reference to FIG. 6B. After transmitting the voice guide broadcast, the MSC-O transmits a 'MODIFY' message, which includes a BC set as 'multimedia', to the MS-O in order to report the setup of call-forwarded multimedia communication in step 544. Then, the MS-O switches into the data mode again, operates the image input unit 26 and the voice processor 20. Further, the MS-O transmits a 'MODIFY CONFIRM' message including a BC set as 'multimedia' to the MSC-O in step 546.

In step 548, the MSC-O transmits an IAM requesting a connection path setup to an MSC-F currently providing a service to an MS-F. The IAM includes a BC 1 set as 'multimedia', a BC 2 set as 'speech' and a CodecList set as 'mm'. In step 550, the MSC-F transmits a 'SETUP' message including a BC 1 set as 'multimedia' and a BC 2 set as 'speech' to the MS-F in response to the IAM. Further, the MSC-F establishes a bearer with the MS-F, checks the state of the MS-F, rings the bell, and checks whether a response to the ringing is detected. If the response to the ringing is not detected, the MSC-F transmits a 'RELEASE' message to the MSC-O similarly to the procedure as shown in FIG. 4. In contrast to the procedure as shown in FIG. 4, if the response to the ringing is detected from the MS-F, the multimedia communication is performed between the MS-O and the MS-F in step 552.

As described above, embodiments of the present invention provide a video phone with a guide broadcast at the same level as that for a voice phone, thereby providing service users with convenience in terms of continuity for an existing voice service and providing carriers with an opportunity for creating new profits through differentiation of services. In particular, the embodiments of the present invention provide a guide broadcast by means of a fallback function without change or addition in hardware, thereby saving the development cost of a guide broadcast system for multimedia communication and shortening the development period.

Although exemplary embodiments of the present invention has been described for illustrative purposes, those skilled in the art will appreciate that various modifications, additions and substitutions are possible, without departing from the scope and spirit of the invention as disclosed in the accompanying claims, including the full scope of equivalents thereof. For example, FIGS. 5 and 6 show that the called party and the call forwarding party are MSs receiving services from the MSC similarly to the MS-O. However, the method for providing a guide broadcasting according to embodiments of the present invention can be applied even when the called party and the call forwarding party are fixed phones or voice mailing system servers.

What is claimed is:

1. A method for providing a voice guide broadcast before a call setup for multimedia communication and fallback speech communication in a mobile communication system for communication between an originating Mobile Station (MS) operating in a speech mode and a data mode and a terminating MS, the method comprising the steps of:

receiving a 'SETUP' message requesting the call setup for multimedia communication and fallback speech communication for communication with the terminating MS from the originating MS;

transmitting a 'CALL PROCEEDING' message permitting the fallback speech communication to the originating MS in order to allow the originating MS to operate in the speech mode when it is unable to connect for multimedia communication to the terminating MS; and establishing a bearer for the fallback speech communication with the originating MS, and transmitting the voice guide broadcasting for reporting no connection to the terminating MS through the bearer.

2. The method in claim 1, wherein the 'CALL PROCEEDING' message includes Bearer Capability (BC) information representing the fallback speech communication.

3. A method for providing a voice guide broadcasting after a call setup for multimedia communication and fallback speech communication in a mobile communication system for communication between an originating Mobile Station (MS) operating in a speech mode and a data mode and a terminating MS, the method comprising the steps of:

receiving a 'SETUP' message requesting the call setup for multimedia communication and fallback speech communication for communication with the terminating MS from the originating MS;

transmitting a 'MODIFY' message for indicating the fallback speech communication to the originating MS in order to allow the originating MS to operate in the speech mode when the terminating MS does not respond to a ringing for multimedia communication; and establishing a bearer for the fallback speech communication with the originating MS, and transmitting the voice guide broadcasting for reporting no connection to the terminating MS through the bearer.

4. The method in claim 3, wherein the 'MODIFY' message includes Bearer Capability (BC) information representing the fallback speech communication.

5. The method in claim 4, further comprising the step of:

receiving a 'MODIFY CONFIRM' message corresponding to the 'MODIFY' message, the 'MODIFY CONFIRM' message includes the BC information representing the fallback speech communication.

6. A method for providing a voice guide broadcasting when a call forwarding is performed before a call setup for multimedia communication and fallback speech communication in a mobile communication system for communication between an originating Mobile Station (MS) operating in a speech mode and a data mode and a terminating MS, the method comprising the steps of:

receiving a 'SETUP' message for requesting the call setup for multimedia communication and fallback speech communication for communication with the terminating MS from the originating MS;

transmitting a 'CALL PROCEEDING' message indicating the fallback speech communication to the originating MS in order to allow the originating MS to operate in the speech mode when the call forwarding has been set for the terminating MS; and establishing a bearer for the fallback speech communication with the originating MS, and transmitting the voice guide broadcasting for reporting that the call forwarding is performed through the bearer.

7. The method in claim 6, wherein the 'CALL PROCEEDING' message includes Bearer Capability (BC) information representing the fallback speech communication.

8. The method in claim 6, further comprising the steps of:
transmitting a 'MODIFY' message for indicating the multimedia communication to the originating MS in order to allow the originating MS to operate in the data mode after transmitting the voice guide broadcasting, and receiving a 'MODIFY CONFIRM' message corresponding to the 'MODIFY' message; and
transmitting a message for requesting a path setup to a forwarding Mobile Switching Center currently providing a service to a forwarding MS for which a call forwarding has been set, and performing the multimedia communication between the originating MS and the forwarding MS when a bearer is established for the forwarding MS.

9. The method in claim 8, wherein the 'MODIFY' message and the 'MODIFY CONFIRM' message include BC information representing the multimedia communication.

10. A method for providing a voice guide broadcasting after a call setup for multimedia communication and fallback speech communication in a mobile communication system for communication between an originating Mobile Station (MS) operating in a speech mode and a data mode and a terminating MS, the method comprising the steps of:
receiving a 'SETUP' message for requesting the call setup for multimedia communication and fallback speech communication for communication with the terminating MS from the originating MS;
transmitting a 'MODIFY' message indicating the fallback speech communication to the originating MS in order to allow the originating MS to operate in the speech mode when the terminating MS does not respond to a ringing for multimedia communication and a call forwarding has been set for the terminating MS; and
establishing a bearer for the fallback speech communication with the originating MS, and transmitting the voice guide broadcasting for reporting no connection to the terminating MS through the bearer.

11. The method in claim 10, wherein the 'MODIFY' message includes Bearer Capability (BC) information representing the fallback speech communication.

12. The method in claim 11, further comprising a step of receiving a 'MODIFY CONFIRM' message corresponding to the 'MODIFY' message, the 'MODIFY CONFIRM' message including the BC information representing the fallback speech communication.

13. The method in claim 10, further comprising the steps of:
transmitting a 'MODIFY' message for indicating the multimedia communication to the originating MS in order to allow the originating MS to operate in the data mode after transmitting the voice guide broadcasting, and receiving a 'MODIFY CONFIRM' message corresponding to the 'MODIFY' message; and
transmitting a message for requesting a path setup to a forwarding Mobile Switching Center currently providing a service to a forwarding MS for which a call forwarding has been set, and performing the multimedia communication between the originating MS and the forwarding MS when a bearer is established for the forwarding MS.

14. The method in claim 13, wherein the 'MODIFY' message and the 'MODIFY CONFIRM' message include BC information representing the multimedia communication.

15. A method for receiving a voice guide broadcasting from a mobile communication system providing speech communication and multimedia communication to an originating Mobile Station (MS) operating in a speech mode and a data mode, the method comprising the steps of:
transmitting a 'SETUP' message for requesting a call setup for multimedia communication and fallback speech communication to a Mobile Switching Center; and
switching into the speech mode and receiving the voice guide broadcasting from the Mobile Switching Center, when a 'CALL PROCEEDING' message or a 'MODIFY' message for indicating the fallback speech communication is received from the Mobile Switching Center before or after the call setup.

16. The method in claim 15, wherein the 'CALL PROCEEDING' message and the 'MODIFY' message include BC information representing the fallback speech communication.

* * * * *